Figure 1:
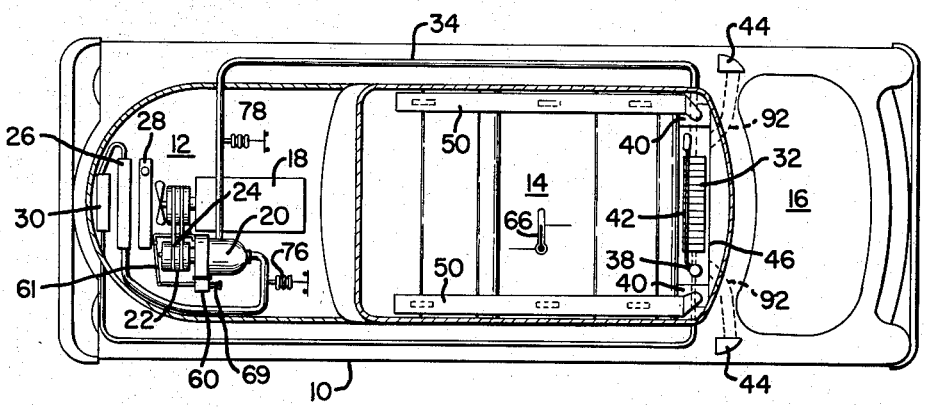

May 29, 1956   J. W. JACOBS   2,747,385

REFRIGERATING APPARATUS

Filed Aug. 26, 1953

INVENTOR.
James W. Jacobs.
BY R. R. Candor.
His Attorney.

United States Patent Office 2,747,385
Patented May 29, 1956

2,747,385

REFRIGERATING APPARATUS

James W. Jacobs, Dayton, Ohio, assignor to General Motors Corporation, Detroit, Mich., a corporation of Delaware Application August 26, 1953, Serial No. 376,606

3 Claims. (Cl. 62—4)

This invention relates to refrigerating apparatus and more particularly to an automobile air conditioning system.

It is an object of this invention to provide a control for the refrigerant compressor which provides maximum protection against compressor damage in the event of abnormal refrigerant pressures and also prevents needless wear on the compressor when no refrigeration is required.

More specifically it is an object of this invention to provide an automobile air conditioning system in which a clutch is provided between the engine and the compressor and in which a solenoid operates the clutch in response to changes in the air temperature within the passenger compartment and also in response to abnormal variations in the refrigerant pressure so as to stop the compressor in the event that the refrigerant charge has been lost or in the event that excessive high head pressures should occur.

Further objects and advantages of the present invention will be apparent from the following description, reference being had to the accompanying drawings, wherein a preferred form of the present invention is clearly shown.

Figure 2:
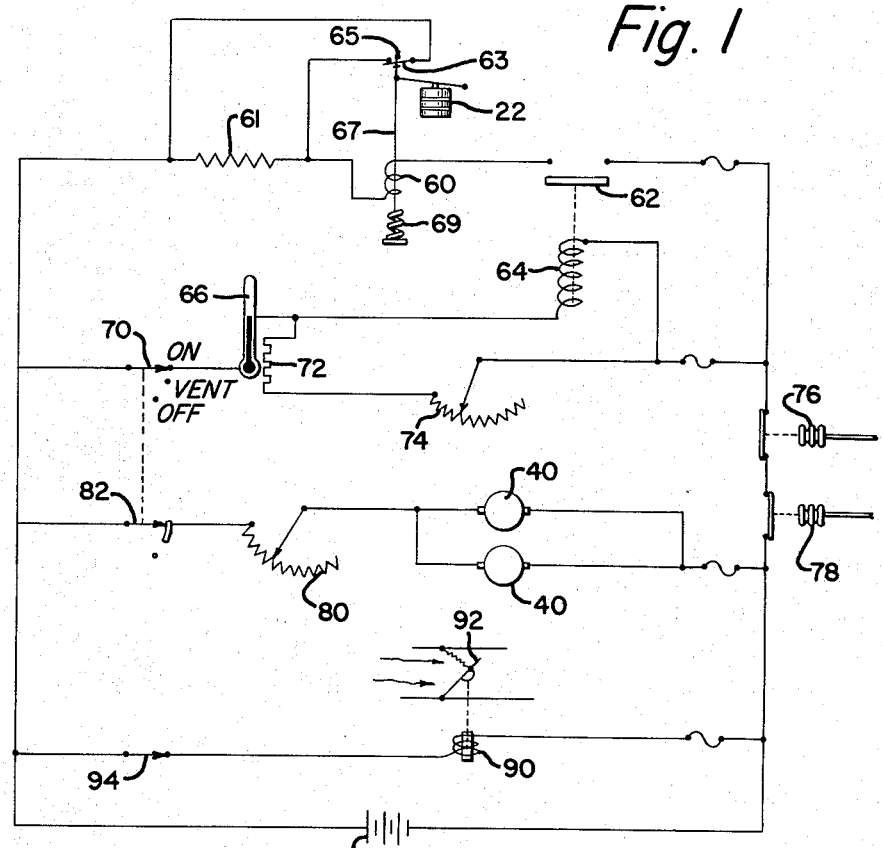

In the drawings:

Figure 1 is a schematic plan view with parts broken away showing the invention applied to a conventional passenger automobile; and, Figure 2 is a schematic view showing the electrical system used in controlling the air conditioning equipment.

Referring now to the drawing wherein a preferred embodiment of the invention has been shown, reference numeral 10 generally designtaes a conventional modern passenger automobile having an engine compartment 12, a passenger compartment 14 and a luggage compartment 16. Reference numeral 18 designates the main engine which is used for propelling the car and for driving a refrigerant compressor 20 through a clutch mechanism 22 and belts 24.

The clutch 22 is of the self-energizing type and preferably is like the clutch fully shown and described in my copending application S. N. 365,593, filed July 2, 1953. Since clutches of the self-energizing type are well known and since the details of the clutch per se may be varied without departing from the spirit of my invention the details of the clutch have not been shown. The solenoid 60 is mounted on the compressor 20 and is provided for initiating the self-energization of clutch. Since the solenoid is not required to apply the actual clutch operating force it does not need to be a large and expensive type of solenoid. The compressor 20 forms a part of a volatile refrigerant air conditioning system which includes a condenser 26 mounted in front of the main engine radiator 28, a receiver 30, an evaporator 32 and refrigerant flow connections 34 which connect the compressor, condenser, receiver and evaporator in a close series refrigerant flow circuit.

The usual thermostatic expansion valve 38 is provided for controlling the flow of high pressure liquid into the evaporator 32 in accordance with standard practice. A pair of blowers 40 are provided for circulating the air to be conditioned within the passenger compartment. Provision is made for returning air from the passenger compartment to the evaporator through a return air opening 42 which for purposes of illustration has been shown located directly behind the rear seat of the passenger compartment of the car.

Fresh air scoops 44 are also provided for scooping fresh air from the sides of the car into the evaporator housing 46. The conditioned air leaves the fan units through air distributing ducts 50 located adjacent the upper sides of the passenger compartment in accordance with present air conditioning practice.

The clutch operating solenoid 60 is arranged in an electric circuit in the manner illustrated in Figure 2 of the drawing so as to be controlled by a switch 62 which is in turn controlled by the solenoid 64 arranged in series circuit relationship with the thermostat 66. A resistance element 61 is arranged in series with the solenoid 60 and in parallel with the solenoid operated switch 63 so that the resistance 61 will cut down the flow of current to the solenoid after the clutch has been engaged. A lost motion connection 65 between the solenoid armature 67 and the switch 63 allows the armature to move far enough to actuate the clutch before the switch 63 opens. A spring 69 biases the armature into declutching position so that when no current flows to the solenoid 60 the compressor does not operate. The usual car battery 68 is used for supplying electrical energy to the various controls as shown. The arrangement is such that when the main air conditioning switch 70 is moved to its "on" position so as to connect the thermostat 66 in circuit with the battery 68 the solenoid 64 will be controlled by the thermostat 66 in such a manner that at high car air temperatures the circuit to the solenoids 64 and 60 will be closed so as to cause engagement of the clutch and consequently operation of the compressor.

For purposes of illustration the thermostat 66 has been shown mounted in the passenger compartment of the car whereas it could be mounted in the return air duct or in any other suitable location where it would be responsive to air conditioning requirements. This thermostat includes a small heater coil 72 which is arranged in series with a rheostat 74 so as to make it possible to adjust the temperature at which the thermostat 66 will close the circuit.

A high pressure cut out control 76 is arranged in the circuit as shown for the purpose of causing deenergization of the clutch operating solenoid in the event that the head pressure becomes excessive for any reason whatsoever. Thus, if moisture should get into the refrigerant circuit and freeze within the expansion valve 38 so as to prevent the flow of liquid refrigerant into the evaporator, the high head-pressure resulting therefrom would stop the compressor until the fault was remedied.

A low pressure cut out device 78 is provided in series with the high pressure control device 76 and is adapted to open the circuit to the clutch operating solenoid in the event of abnormally low suction pressures such as might result from a loss of the refrigerant charge.

The blower motors are preferably of the variable speed type and are arranged in circuit with a speed controlling rheostat 80 and a manual control switch 82. The manual control switch 82 is tied in with the manual control switch 70 so that whenever the air conditioning control switch 70 is moved to the "on" position or the "ventilating" position the blowers 40 will be caused to operate. In order to discontinue operation of the blowers it is necessary to move the switches 70 and 82 to the "off" position.

The introduction of fresh air into the evaporator housing is controlled by a solenoid 90 which serves to operate damper means 92 in the fresh air ducts. A manual switch 94 is provided as shown for controlling the solenoid means 90. The switch 94 is preferably mounted on the dashboard of the car so as to be readily accessible to the driver at all times. When for any reason the outside air temperatures are either excessively high or low so as to cause uncomfortable conditions within the passenger compartment, it is possible to close the fresh air control damper means 92.

In accordance with the provisions of rule 78a, reference is made to the following prior filed applications: Ser. No. 350,185 filed April 21, 1953, and Ser. No. 365,593 filed July 2, 1953.

While the form of embodiment of the invention as herein disclosed constitutes a preferred form, it is to be understood that other forms might be adopted, as may come within the scope of the claims which follow.

What is claimed is as follows:

1. In combination with a car having a passenger compartment and an engine compartment, an engine within said engine compartment, a compressor, torque transmitting means between said engine and said compressor including a clutch, a solenoid for energizing said clutch, a refrigerant evaporator, blower means for circulating air to be conditioned for said passenger compartment in thermal exchange with said evaporator, a condenser, refrigerant flow connections between said compressor, condenser and evaporator, a source of electrical energy, circuit means connecting said solenoid to said source, temperature responsive switch means in said circuit means for controlling the operation of said solenoid, and means responsive to refrigerant pressure within said refrigerant flow connections controlling the energization of said solenoid, and means for reducing the flow of current to said solenoid upon actuation of said clutch by said solenoid so as to reduce the amount of electrical energy required to maintain said clutch in compressor driving position.

2. In combination with a car having a passenger compartment and an engine compartment, an engine within said engine compartment, a compressor, torque transmitting means between said engine and said compressor including a clutch, a solenoid for energizing said clutch, a refrigerant evaporator, blower means for circulating air to be conditioned for said passenger compartment in thermal exchange with said evaporator, a condenser, refrigerant flow connections between said compressor, condenser and evaporator, a source of electrical energy, circuit means connecting said solenoid to said source, temperature responsive switch means in said circuit means for controlling the operation of said solenoid, and means responsive to refrigerant pressure within said refrigerant flow connections controlling the energization of said solenoid, and means for reducing the flow of current to said solenoid upon actuation of said clutch by said solenoid so as to reduce the amount of electrical energy required to maintain said clutch in compressor driving position, said last named means comprising a resistance element in series with said solenoid and a switch for short circuiting said resistance element in response to a predetermined movement of said solenoid.

3. In combination with a car having a passenger compartment and an engine compartment, an engine within said engine compartment, a compressor, torque transmitting means between said engine and said compressor including a clutch, a solenoid for energizing said clutch, a refrigerant evaporator, blower means for circulating air to be conditioned for said passenger compartment in thermal exchange with said evaporator, a condenser, refrigerant flow connections between said compressor, condenser and evaporator, a source of electrical energy, circuit means connecting said solenoid to said source, switch means in said circuit means for controlling the operation of said solenoid, and means for reducing the flow of current to said solenoid upon actuation of said clutch by said solenoid so as to reduce the amount of electrical energy required to maintain said clutch in compressor driving position.

References Cited in the file of this patent

UNITED STATES PATENTS

| | | |
|---|---|---|
| 2,124,981 | Krackowizer | July 26, 1938 |
| 2,264,821 | Zukoski | Dec. 2, 1941 |
| 2,286,961 | Hanson | June 16, 1942 |
| 2,344,864 | Griswold | Mar. 21, 1944 |
| 2,346,017 | Errath | Apr. 4, 1944 |
| 2,449,888 | Edwards | Sept. 21, 1948 |
| 2,495,350 | Smith | Jan. 24, 1950 |
| 2,569,009 | Kuempel | Sept. 25, 1951 |
| 2,636,356 | Ryan | Apr. 28, 1953 |